United States Patent
Takizawa et al.

(10) Patent No.: US 10,158,246 B2
(45) Date of Patent: Dec. 18, 2018

(54) ENERGY STORAGE DEVICE, TRANSPORT APPARATUS, AND CONTROL METHOD

(71) Applicant: HONDA MOTOR CO., LTD., Tokyo (JP)

(72) Inventors: Daijiro Takizawa, Wako (JP); Ryota Unno, Wako (JP); Hirokazu Oguma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 15/279,434

(22) Filed: Sep. 29, 2016

(65) Prior Publication Data

US 2017/0093186 A1 Mar. 30, 2017

(30) Foreign Application Priority Data

Sep. 29, 2015 (JP) ................................. 2015-192203

(51) Int. Cl.
*H02J 7/00* (2006.01)
*H02J 7/14* (2006.01)

(52) U.S. Cl.
CPC .......... *H02J 7/1492* (2013.01); *H02J 7/1423* (2013.01); *Y02T 10/92* (2013.01)

(58) Field of Classification Search
USPC ................................ 320/107, 108, 113, 134
See application file for complete search history.

(56) References Cited

U.S. PATENT DOCUMENTS

| | | | |
|---|---|---|---|
| 2008/0122399 A1* | 5/2008 | Nishino ................ | H02J 7/0075 320/103 |
| 2015/0331472 A1* | 11/2015 | Iwamoto ............... | G06F 1/3212 713/323 |
| 2017/0054401 A1* | 2/2017 | Takizawa .............. | H02J 7/0013 |

FOREIGN PATENT DOCUMENTS

| | | | |
|---|---|---|---|
| JP | 2011-199934 | 10/2011 | |
| JP | 2014-082857 | 5/2014 | |
| JP | WO 2014115209 A1 * | 7/2014 | .......... B60L 11/1816 |
| JP | 2015-029398 | 2/2015 | |

OTHER PUBLICATIONS

Japanese Office Action for corresponding JP Application No. 2015-192203, dated May 23, 2017 (w/ English machine translation).
Japanese Office Action for corresponding JP Application No. 2015-192203, dated Jan. 31, 2017.

* cited by examiner

*Primary Examiner* — Brian Ngo
(74) *Attorney, Agent, or Firm* — Mori & Ward, LLP

(57) ABSTRACT

An energy storage device includes a first energy storage, a second energy storage, a voltage converter, and a controller. The first energy storage has a first resistance to degradation of a charging capacity of the first energy storage. The second energy storage has a second resistance to degradation of a charging capacity of the second energy storage higher than the first resistance. The voltage converter converts a voltage output from the second energy storage or supplied from an external electric power source to charge at least one of the first energy storage and the second energy storage. The controller controls the voltage converter so as to supply electric power from the second energy storage to the first energy storage before charging the at least one of the second energy storage and the first energy storage with electric power supplied from the external electric power source.

16 Claims, 10 Drawing Sheets

ENERGY STORAGE DEVICE, TRANSPORT APPARATUS, AND CONTROL METHOD

CROSS-REFERENCE TO RELATED APPLICATIONS

The present application claims priority under 35 U.S.C. § 119 to Japanese Patent Application No. 2015-192203, filed Sep. 29, 2015, entitled "Energy Storage Device, Transport Apparatus, and Control Method." The contents of this application are incorporated herein by reference in their entirety.

BACKGROUND

1. Field

The present disclosure relates to an energy storage device, a transport apparatus, and a control method.

2. Description of the Related Art

Japanese Unexamined Patent Application Publication No. 2014-082857 discloses a power supply system to be installed in a vehicle, the system charging a plurality of energy storage devices by using an external power source. The power supply system includes a first energy storage device that is a power source to an electrical load, the electrical load being a drive source of the vehicle; a converter configured to bidirectionally adjust a voltage between the first energy storage device and the electrical load; a second energy storage device that is connected to the converter in parallel; a charging device connected to the second energy storage device in parallel, the charging device being configured to charge at least one of the first energy storage device and the second energy storage device by using the power source outside the vehicle; and a control device configured to control the converter in such a manner that the first energy storage device is charged by using power from the second energy storage device and power from the charging device. When remaining energy of the second energy storage device is lower than a threshold, the control device causes the second energy storage device to be charged by using the charging device prior to charging of the first energy storage device. Then, as a result of charging of the first energy storage device by using power from the second energy storage device and power from the charging device, when the remaining energy of the second energy storage device is lower than the threshold, the control device again causes the second energy storage device to be charged by using the charging device.

SUMMARY

According to a first aspect of the present disclosure, an energy storage device includes a first energy storage, a second energy storage, a voltage converter, and a controller. The first energy storage has a first resistance to degradation of a charging capacity of the first energy storage. The second energy storage has a second resistance to degradation of a charging capacity of the second energy storage higher than the first resistance. The voltage converter converts a voltage output from the second energy storage or supplied from an external electric power source to charge at least one of the first energy storage and the second energy storage. The controller controls the voltage converter so as to supply electric power from the second energy storage to the first energy storage before charging the at least one of the second energy storage and the first energy storage with electric power supplied from the external electric power source.

According to a second aspect of the present disclosure, a control method includes charging at least one of a first energy storage and a second energy storage. The first energy storage has a first resistance to degradation of a charging capacity of the first energy storage. The second energy storage has a second resistance to degradation of a charging capacity of the second energy storage higher than the first resistance. The method includes converting a voltage output from the second energy storage or supplied from an external electric power source. The method includes supplying electric power from the second energy storage to the first energy storage before charging the at least one of the second energy storage and the first energy storage with electric power supplied from the external electric power source.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
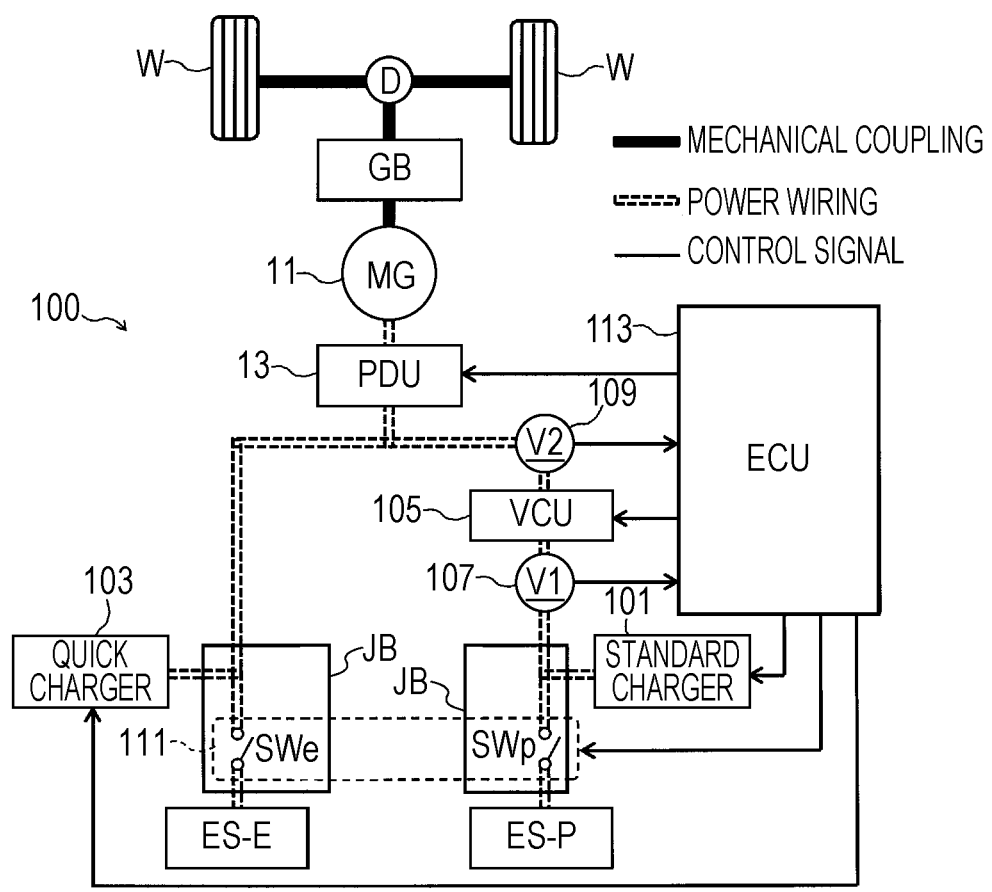
FIG. 1 is a block diagram illustrating a schematic configuration of an electric vehicle in which an energy storage device according to an embodiment of the present disclosure is installed.

The embodiments will now be described with reference to the accompanying drawings, wherein like reference numerals designate corresponding or identical elements throughout the various drawings.

Hereinafter, an embodiment of the present disclosure will be described with reference to the drawings.

FIG. 1 is a block diagram illustrating a schematic configuration of an electric vehicle in which an energy storage device according to an embodiment of the present disclosure is installed. In FIG. 1, a thick solid line represents mechanical coupling, a dotted double line represents power wiring, and a thin sold line represents a control signal. The electric vehicle illustrated in FIG. 1, which is a one-motor (1MOT) electric vehicle, includes a motor generator (MG) 11, a power drive unit (PDU) 13, and an energy storage device 100 according to the embodiment. Each component of the electric vehicle will be described below.

The motor generator 11 is driven by power supplied from the energy storage device 100 and generates power for the electric vehicle to run. A torque generated by the motor generator 11 is transmitted through a gearbox GB and a differential gear D to driving wheels W, the gearbox GB being a variable-stage gearbox or a fixed-stage gearbox. During speed reduction of the electric vehicle, the motor generator 11 operates as a power generator and outputs a braking force of the electric vehicle. Note that regenerative power generated by operating the motor generator 11 as a power generator is stored in batteries included in the energy storage device 100.

The PDU 13 converts a direct-current voltage to an alternating-current voltage to supply a three-phase current to the motor generator 11. The PDU 13 converts an alternating-current voltage that is input at the time of a regeneration operation of the motor generator 11 to a direct-current voltage.

As illustrated in FIG. 1, the energy storage device 100 includes a high-capacity battery ES-E, a high-power battery ES-P, a standard charger 101, a quick charger 103, a voltage control unit (VCU) 105, a V1 sensor 107, a V2 sensor 109, a switch group 111, and an electronic control unit (ECU) 113.

The high-capacity battery ES-E includes a plurality of energy storage cells, such as lithium-ion batteries or nickel-metal hydride batteries, and supplies high-voltage power to the motor generator 11. The high-power battery ES-P also includes a plurality of energy storage cells, such as lithium-ion batteries or nickel-metal hydride batteries, and supplies high-voltage power through the VCU 105 to the motor generator 11. The high-power battery ES-P and the high-capacity battery ES-E are connected in parallel to the PDU 13, with the VCU 105 interposed between the high-power battery ES-P and the PDU 13. The voltage of the high-power battery ES-P is typically lower than the voltage of the high-capacity battery ES-E. Therefore, the power of the high-power battery ES-P is boosted by the VCU 105 to the level of the voltage of the high-capacity battery ES-E, and then supplied through the PDU 13 to the motor generator 11.

Note that the high-capacity battery ES-E and the high-power battery ES-P are not limited to secondary batteries, such as the lithium-ion batteries or nickel-metal hydride batteries described above. For example, in spite of low storage capacity, a capacitor that enables charging and discharging by using a large amount of power in a short time may be used as the high-power battery ES-P.

The high-capacity battery ES-E and the high-power battery ES-P having different characteristics. The high-capacity battery ES-E has a lower power weight density and a higher energy weight density than the high-power battery ES-P. Conversely, the high-power battery ES-P has a lower energy weight density and a higher power weight density than the high-capacity battery ES-E. Thus, the high-capacity battery ES-E is relatively superior in terms of the energy weight density, and the high-power battery ES-P is relatively superior in terms of the power weight density. Note that the energy weight density means energy per unit weight (Wh/kg), and the power weight density means power per unit weight (W/kg). Therefore, the high-capacity battery ES-E superior in terms of the energy weight density is an energy storage unit which is primarily intended to achieve high capacity, and the high-power battery ES-P superior in terms of power weight density is an energy storage unit which is primarily intended to achieve high power.

Such differences in characteristics between the high-capacity battery ES-E and the high-power battery ES-P are attributed to various parameters that are determined by the structure, materials, and the like of battery components, such as electrodes, active materials, electrolyte, and an electrolyte solution. For example, the high-capacity battery ES-E is superior to the high-power battery ES-P in terms of the storage capacity, which is a parameter indicating a total amount of electricity that can be used for charging and discharging, whereas the high-power battery ES-P is superior to the high-capacity battery ES-E in terms of a charge rate (C-rate) characteristic, which is a parameter indicating the resistance to degradation of storage capacity owing to charging and discharging, and also in terms of the internal resistance (impedance), which is a parameter indicating the value of an electrical resistance to charging and discharging.

Figure 2A:
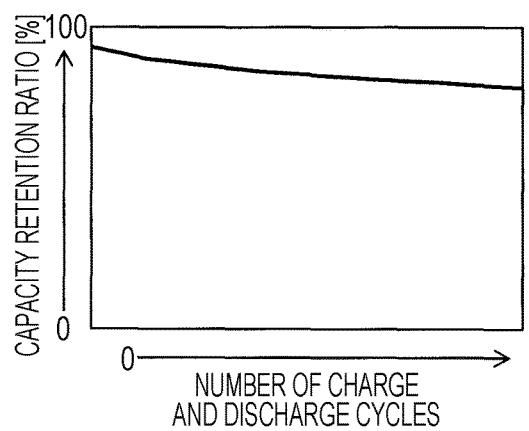
FIG. 2A illustrates a change in the capacity retention ratio of a high-power battery depending on an increase in the number of charge and discharge cycles.
Figure 2B:
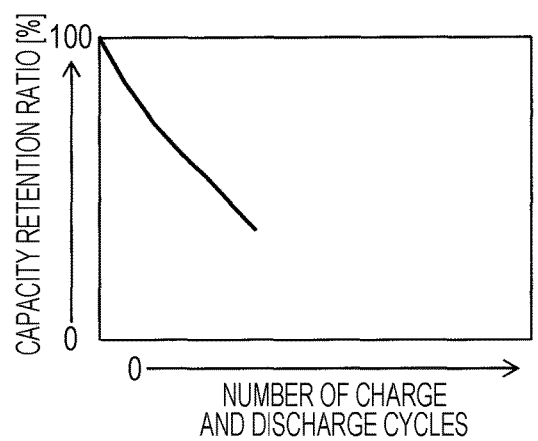
FIG. 2B illustrates a change in the capacity retention ratio of a high-capacity battery depending on an increase in the number of charge and discharge cycles.
Figure 2C:
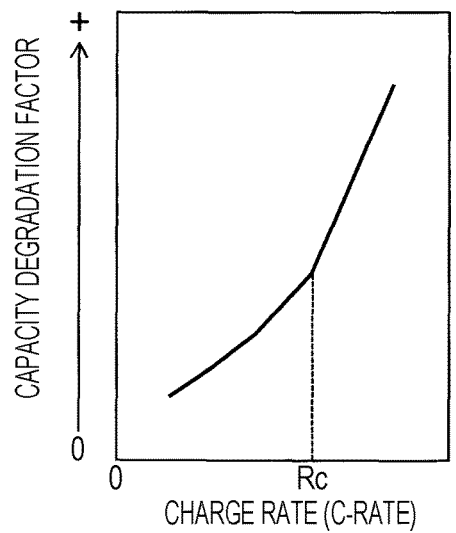
FIG. 2C illustrates a difference in the capacity degradation factor of the high-capacity battery depending on a charge rate in a continuously energized state during charging.

FIG. 2A illustrates a change in the capacity retention ratio of the high-power battery ES-P depending on an increase in the number of charge and discharge cycles. FIG. 2B illustrates a change in the capacity retention ratio of the high-capacity battery ES-E depending on an increase in the number of charge and discharge cycles. FIG. 2C illustrates a difference in the capacity degradation factor of the high-capacity battery ES-E depending on a charge rate in a continuously energized state during charging. Comparing FIG. 2A and FIG. 2B with each other, the decrease in the capacity retention ratio depending on an increase in the number of charge and discharge cycles is lower in FIG. 2A, i.e., in the high-power battery ES-P. Thus, the high-power battery ES-P is superior to the high-capacity battery ES-E in terms of the resistance to degradation of storage capacity owing to charging and discharging. That is, the high-power battery ES-P is superior in terms of charge acceptance. FIG. 2A and FIG. 2B respectively illustrate the high-power battery ES-P and the high-capacity battery ES-E subjected to charging and discharging at a fixed rate (C-rate). As illustrated in FIG. 2C, the capacity degradation factor of the high-capacity battery ES-E decreases with a decrease in the charge rate.

The standard charger 101 is connected in parallel to the high-power battery ES-P and the VCU 105 with a junction box JB interposed between the high-power battery ES-P and the VCU 105. The standard charger 101 converts alternating-current power from an external power source, such as a commercial power source, to direct-current power at an output voltage level of the high-power battery ES-P.

The quick charger 103 is connected in parallel to the high-capacity battery ES-E with a junction box JB interposed between the high-capacity battery ES-E and the PDU 13. The quick charger 103 converts alternating-current power from an external power source, such as a commercial power source, to direct-current power at an output voltage level of the high-capacity battery ES-E.

The VCU 105 boosts the output voltage of the high-power battery ES-P or the voltage of direct-current power output from the standard charger 101 without converting it from a direct current. In addition, during speed reduction of the electric vehicle, the VCU 105 lowers the voltage of power that is generated by the motor generator 11 and converted to a direct current. Furthermore, the VCU 105 lowers the output voltage of the high-capacity battery ES-E or the voltage of direct-current power output from the quick charger 103 without converting it from a direct current. The power that has been lowered in voltage by the VCU 105 is used to charge the high-power battery ES-P.

The V1 sensor 107 detects a voltage V1 of the high-power battery ES-P. A signal representing the voltage V1 detected by the V1 sensor 107 is transmitted to the ECU 113. The V2 sensor 109 detects a voltage V2 of the high-capacity battery ES-E. The voltage V2 detected by the V2 sensor 109 is equal to a value obtained by the VCU 105 by boosting the voltage V1 of the high-power battery ES-P. A signal representing the voltage V2 detected by the V2 sensor 109 is transmitted to the ECU 113.

The switch group 111 includes, in the junction boxes JB, a switch SWe for connecting and disconnecting a current path extending from the standard charger 101 or the quick charger 103 to the high-capacity battery ES-E and a switch SWp for connecting and disconnecting a current path extending from the standard charger 101 or the quick charger 103 to the high-power battery ES-P. Each of the switches SWe and SWp is opened and closed under control of the ECU 113.

The ECU 113 controls the PDU 13, the VCU 105, the standard charger 101, and the quick charger 103 and controls opening and closing of the switch group 111. The ECU 113 derives the energy stored (also referred to as a state of charge (SOC) or remaining energy) in each of the high-capacity battery ES-E and the high-power battery ES-P by a current integration method and/or an open-circuit voltage (OCV) estimation method.

Figure 3:
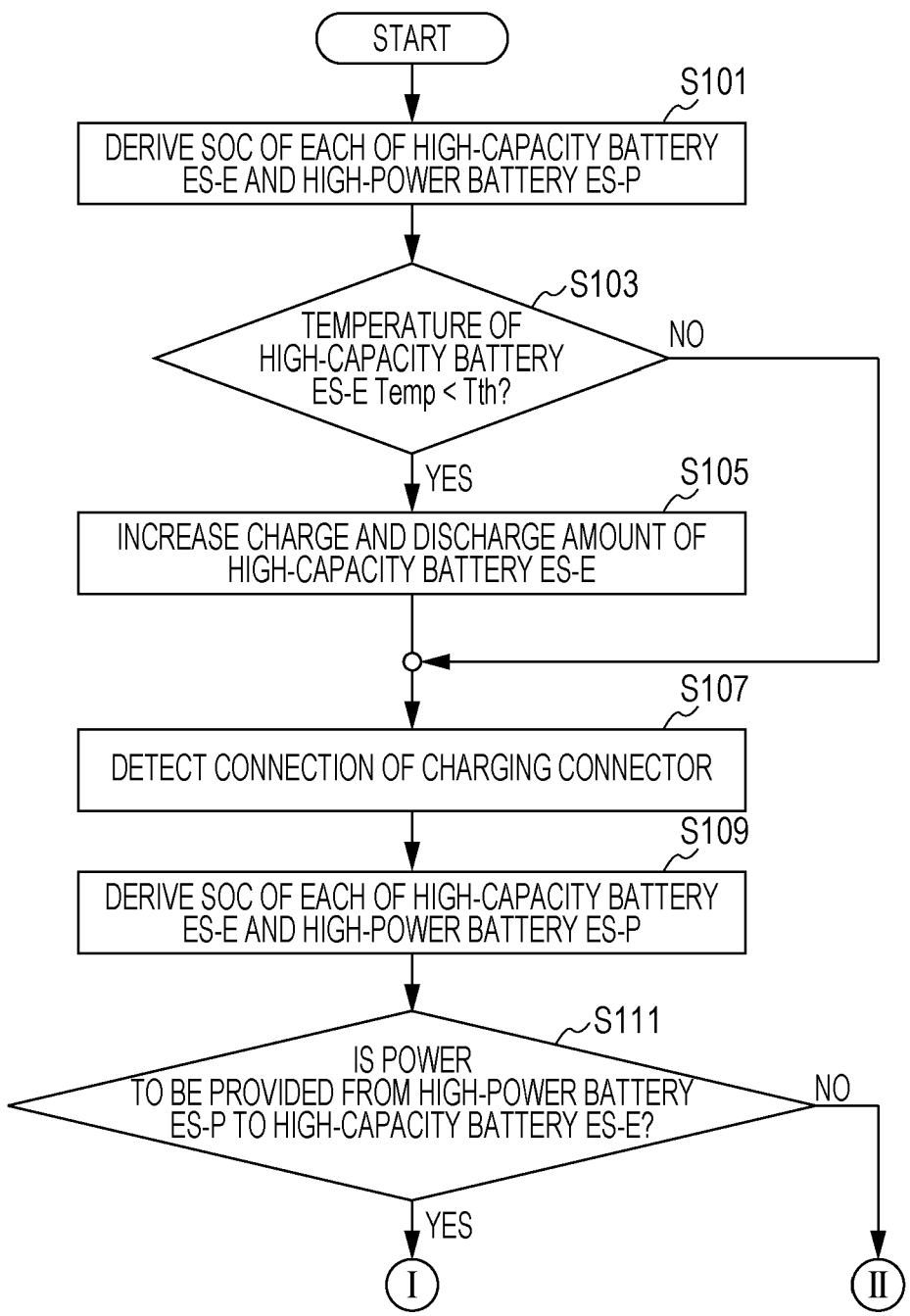
FIG. 3 is a flowchart illustrating a process flow of charge control performed by an electronic control unit (ECU).
Figure 4:
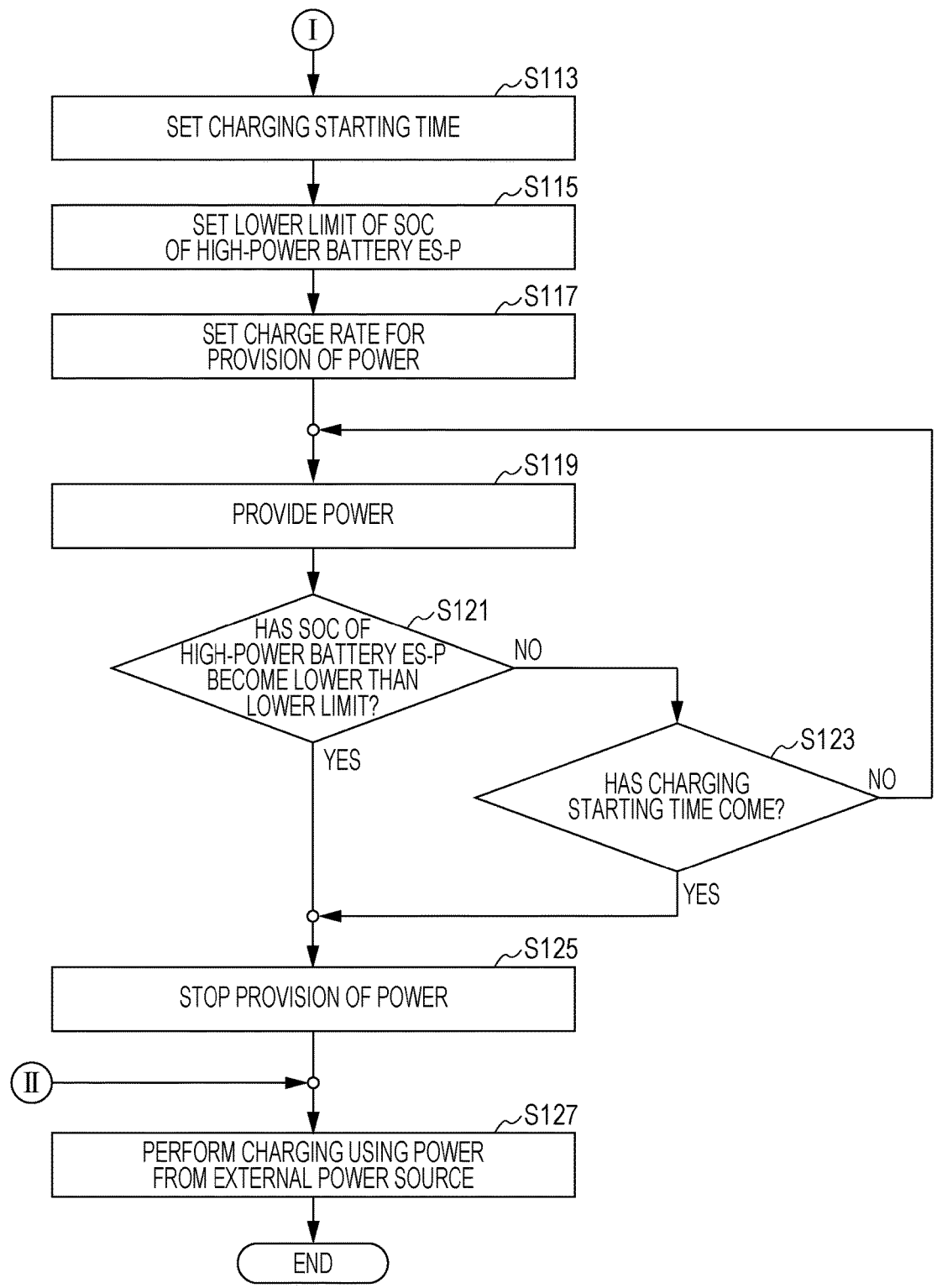
FIG. 4 is a flowchart illustrating the process flow of charge control performed by the ECU.

In addition, the ECU 113 performs control in such a manner that, at the time of charging of the high-capacity battery ES-E and the high-power battery ES-P by using power from an external power source through the standard charger 101 or the quick charger 103, power is supplied from the high-power battery ES-P and the high-capacity battery ES-E in order to increase in advance the SOC of the high-capacity battery ES-E. This control will be described below in detail with reference to FIG. 3 and FIG. 4. FIG. 3 and FIG. 4 are flowcharts illustrating a process flow of charge control performed by the ECU 113.

As illustrated in FIG. 3, while the electric vehicle is running, from values detected by the V1 sensor 107 and the V2 sensor 109 and values detected by current sensors (not illustrated) that detect the respective charge and discharge currents of the high-capacity battery ES-E and the high-power battery ES-P, the ECU 113 derives the SOC of each of the high-capacity battery ES-E and the high-power battery ES-P by a current integration method (step S101). Then, the ECU 113 determines whether or not a value Temp is lower than a threshold Tth (whether Temp<Tth is satisfied) (step S103), the value Temp being detected by a temperature sensor (not illustrated) that detects the temperature of the high-capacity battery ES-E. If Temp<Tth is satisfied, the process proceeds to step S105; if Temp Tth is satisfied, the process proceeds to step S107.

Figure 5:
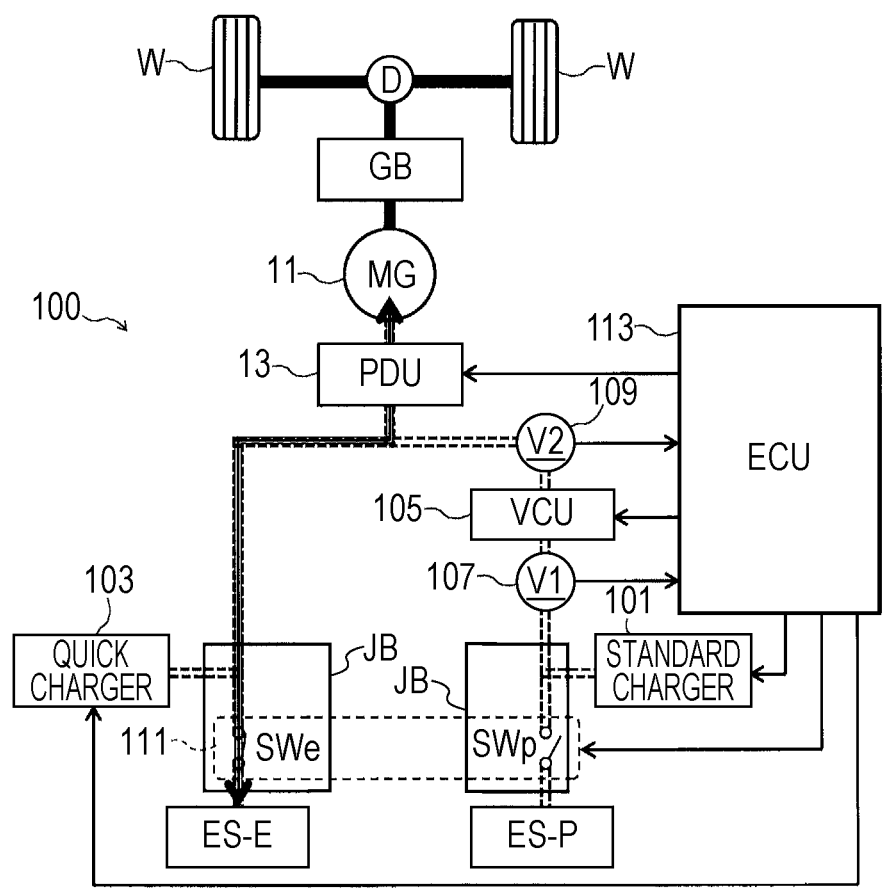
FIG. 5 illustrates a charge and discharge current flowing between the high-capacity battery and a motor generator at the time of increasing the temperature of the high-capacity battery.

In step S105, the ECU 113 increases the charge and discharge amount of the high-capacity battery ES-E in order to increase the temperature of the high-capacity battery ES-E. The charge and discharge current flowing at this time between the high-capacity battery ES-E and the motor generator 11 is illustrated in FIG. 5. By increasing the charge and discharge amount of the high-capacity battery ES-E, the temperature of the high-capacity battery ES-E is increased so as to enhance the charge acceptance of the high-capacity battery ES-E. Then, after the electric vehicle stops, in step S107, the ECU 113 detects a state where the standard charger 101 or the quick charger 103 is connected to an external power source via a charging connector (not illustrated). Then, from the values detected by the V1 sensor 107 and the V2 sensor 109, the ECU 113 derives the SOC of each of the high-capacity battery ES-E and the high-power battery ES-P by an OCV estimation method (step S109).

Prior to charging of the high-capacity battery ES-E and the high-power battery ES-P by using power from the external power source, the ECU 113 determines whether or not power is to be provided from the high-power battery ES-P to the high-capacity battery ES-E (step S111). If it is determined that power is to be provided, the process proceeds to step S113 illustrated in FIG. 4; if it is determined that power is not to be provided, the process proceeds to step S127 illustrated in FIG. 4. Note that the ECU 113 uses, as a criterion for determination in step S111 as to whether or not power is to be provided, an external factor that affects charging of the high-capacity battery ES-E and the high-power battery ES-P by using power from the external power source. In the case where the external factor is a preset expected time of next use of the electric vehicle, when there is not much time before the expected time of next use, the ECU 113 determines that power is not to be provided. In addition, in the case where the external factor is a preset time (charging starting time) at which the charging of the high-capacity battery ES-E and the high-power battery ES-P starts by using power from the external power source, when there is much time before the charging starting time, the ECU 113 determines that power is to be provided.

Since whether or not power is to be provided is determined on the basis of an external factor in the above manner, it is possible to reduce a loss in energy stored in the entire energy storage device owing to unnecessary provision of power.

In step S113, the ECU 113 sets the charging starting time at which the charging starts by using power from the external power source via the standard charger 101 or the quick charger 103. Then, the ECU 113 sets a lower limit of the SOC of the high-power battery ES-P, which decreases due to provision of power from the high-power battery ES-P to the high-capacity battery ES-E (step S115). In other words, the provision of power is performed until the SOC of the high-power battery ES-P decreases to reach the set lower limit. The lower limit set in step S115 is determined on the basis of the charging starting time set in step S113, and if the time period before the charging starting time is shorter than a predetermined time period, the ECU 113 sets, as the lower limit, a value that is lower than the lower limit set when the time period is longer than or equal to the predetermined time period.

Note that it is preferable that the charge rate for the provision of power be set to an appropriate value on the basis of the capacity degradation factor of the high-capacity battery ES-E in a continuously energized state. As illustrated in FIG. 2C, the capacity degradation factor decreases with a decrease in the charge rate; at the same time, the charge amount of the high-capacity battery ES-E by using the external power source is increased. As a result, it is not possible to suppress degradation of the high-capacity battery ES-E.

As illustrated in FIG. 2C, when the charge rate is higher than or equal to a certain value, the high-capacity battery ES-E has a region in which the dependency of the capacity degradation factor on the charge rate is strong. In the example illustrated in FIG. 2C, in the region where the charge rate is higher than or equal to a charge rate Rc, the inclination of the capacity degradation factor is strong. Therefore, a possible index for determining the charge rate for the provision of power may be a charge rate in a region where the inclination of the capacity degradation factor with respect to the charge rate is lower than or equal to a threshold.

By performing the provision of power at a charge rate that is determined on the basis of such an index, it is possible to transmit appropriate energy to the high-capacity battery ES-E by taking into account the degradation of the high-capacity battery ES-E owing to the charge rate.

Then, the ECU 113 sets the charge rate for the provision of power from the high-power battery ES-P to the high-capacity battery ES-E to the value determined on the basis of the above index (step S117). The ECU 113 sets the charge rate set in step S117 to a value lower than the charge rate for charging by using power from the external power source, which is described later.

Figure 6:
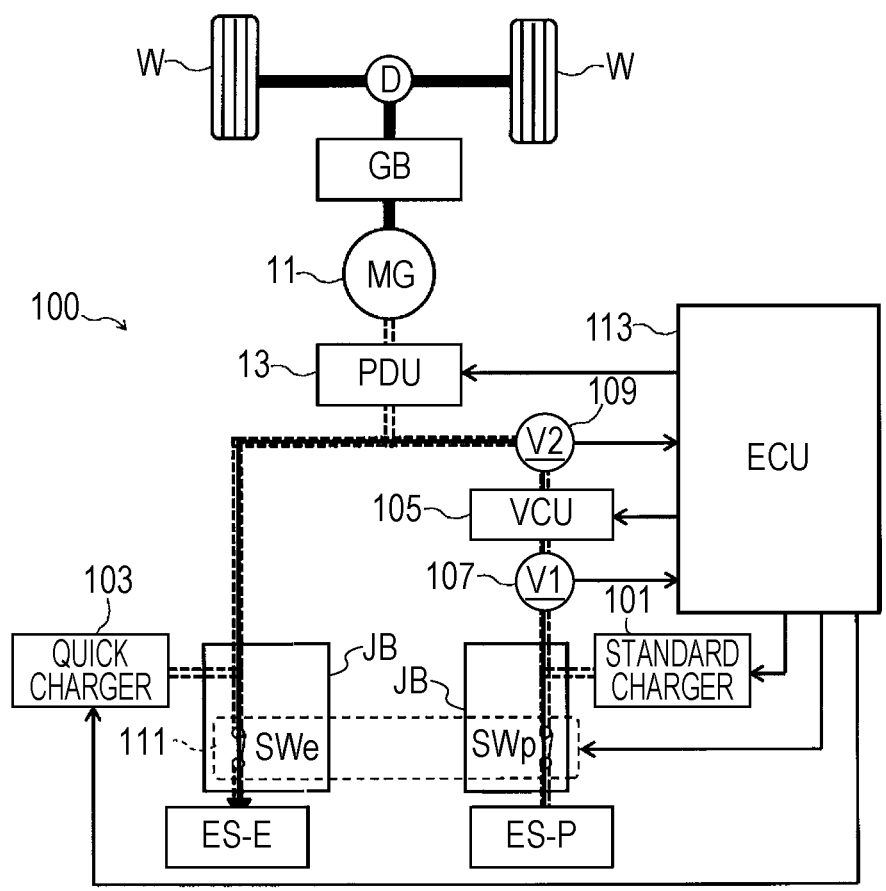
FIG. 6 illustrates a current flowing from the high-power battery to the high-capacity battery at the time of provision of power.

Then, the ECU 113 controls the VCU 105 and the switch group 111 in such a manner that power is provided from the high-power battery ES-P to the high-capacity battery ES-E (step S119). The current flowing from the high-power battery ES-P to the high-capacity battery ES-E at this time is illustrated in FIG. 6. As illustrated in FIG. 6, at the time of the provision of power, the ECU 113 performs control in such a manner that both of the switches SWe and SWp included in the switch group 111 are closed and the VCU 105 performs a boosting operation.

Then, the ECU 113 determines whether or not the SOC of the high-power battery ES-P has become lower than the lower limit set in step S115 (step S121). If the SOC has become lower than the lower limit, the process proceeds to step S125; if not, the process proceeds to step S123. In step S123, the ECU 113 determines whether or not the charging starting time set in step S113 has come. If the charging starting time has come, the process proceeds to step S125; if not, the process returns to step S119. In step S125, the ECU 113 stops the provision of power from the high-power battery ES-P to the high-capacity battery ES-E.

Figure 7:
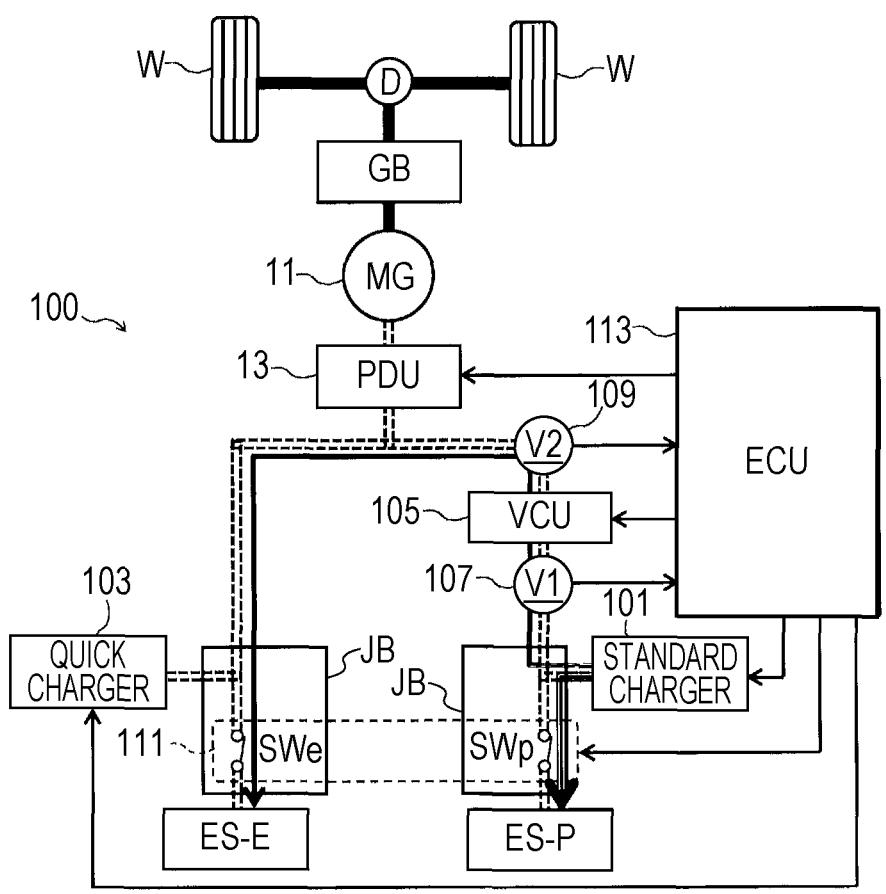
FIG. 7 illustrates a current flowing from an external power source to the high-capacity battery and the high-power battery through a standard charger.

Then, the ECU 113 controls the standard charger 101 or the quick charger 103, the VCU 105, and the switch group 111 in such a manner that charging is performed by using power supplied from the external power source via the standard charger 101 or the quick charger 103 (step S127). The current flowing from the external power source to the high-capacity battery ES-E and the high-power battery ES-P through the standard charger 101 at this time is illustrated in FIG. 7. At the time of the charging illustrated in FIG. 7, the ECU 113 performs control in such a manner that the standard charger 101 is operated, both of the switches SWe and SWp included in the switch group 111 are closed, and the VCU 105 performs a boosting operation. At this time, the ECU 113 controls the VCU 105 in such a manner that the charge rate of the high-capacity battery ES-E is lower than the charge rate of the high-power battery ES-P. If the SOC of the high-power battery ES-P has reached the upper limit, as illustrated in FIG. 8, the ECU 113 opens the switch SWp to stop the charging of the high-power battery ES-P and continues only the charging of the high-capacity battery ES-E.

Figure 8:
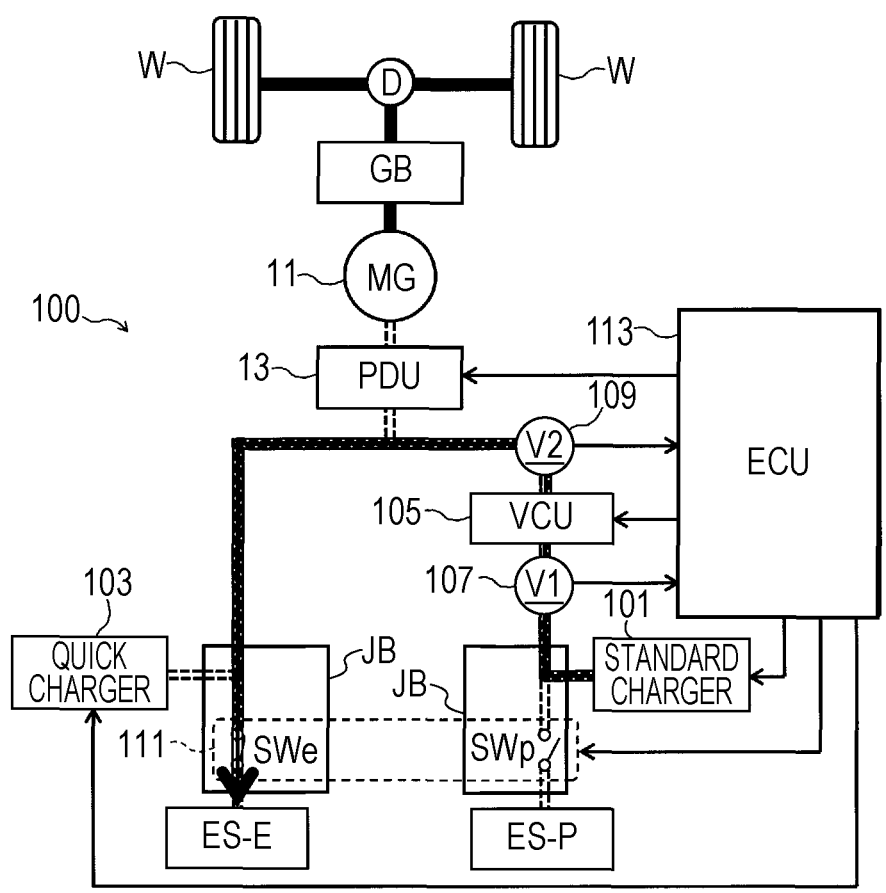
FIG. 8 illustrates a current flowing from the external power source to the high-capacity battery through the standard charger.
Figure 9:
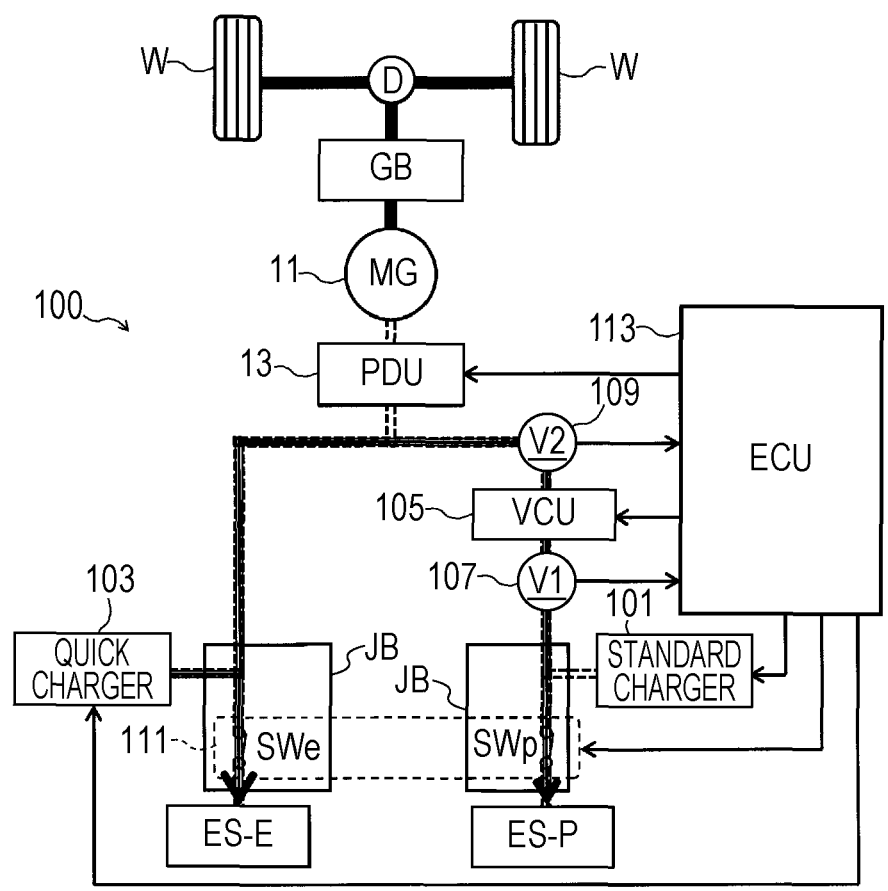
FIG. 9 illustrates a current flowing from the external power source to the high-capacity battery and the high-power battery through a quick charger.
Figure 10:
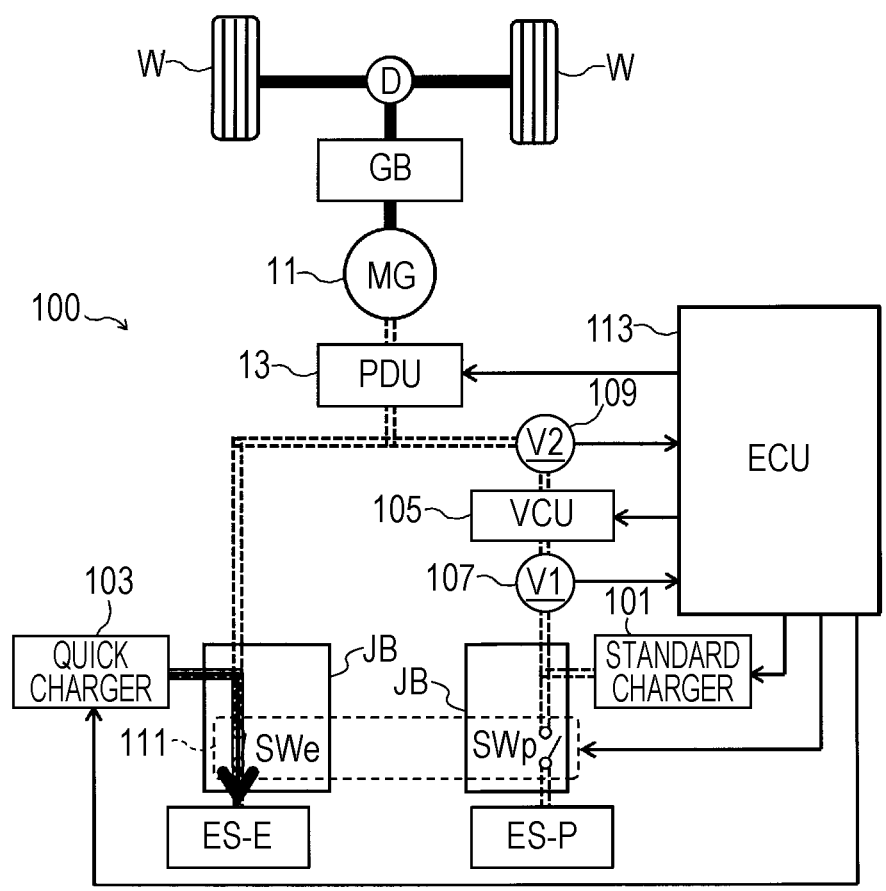
FIG. 10 illustrates a current flowing from the external power source to the high-capacity battery through the quick charger.

The examples illustrated in FIG. 7 and FIG. 8 illustrate the current flowing from the external power source in the state where the standard charger 101 is connected to the external power source via a charging connector. However, in the state where the quick charger 103 is connected to the external power source via a charging connector, as illustrated in FIG. 9, the ECU 113 performs control in such a manner that the quick charger 103 is operated, both of the switches SWe and SWp included in the switch group 111 are closed, and the VCU 105 lowers the voltage. At this time, the ECU 113 controls the VCU 105 in such a manner that the charge rate of the high-capacity battery ES-E is lower than the charge rate of the high-power battery ES-P. If the SOC of the high-power battery ES-P has reached the upper limit, as illustrated in FIG. 10, the ECU 113 opens the switch SWp to stop the charging of the high-power battery ES-P and continues only the charging of the high-capacity battery ES-E.

As described above, according to the embodiment, prior to charging of at least one of the high-capacity battery ES-E and the high-power battery ES-P by using power supplied from the external power source, by the provision of power from the high-power battery ES-P to the high-capacity battery ES-E, the SOC of the high-capacity battery ES-E is increased in advance. Thus, the charge amount of the high-capacity battery ES-E by using power from the external power source can be reduced. Since the high-capacity battery ES-E has a lower resistance to degradation of storage capacity owing to charging than the high-power battery ES-P, degradation of the high-capacity battery ES-E caused by charging can be suppressed by reducing the charge amount and number of charge operations of the high-capacity battery ES-E by using power from the external power source, as a result of the above-described provision of power.

While degradation of an energy storage unit is suppressed with a decrease in the charge rate, degradation of the high-capacity battery ES-E at the time of the provision of power can be further suppressed because the ECU 113 sets the charge rate of the high-capacity battery ES-E at the time of the provision of power to be lower than the charge rate of the high-capacity battery ES-E at the time of charging by using power from the external power source.

In addition, since the ECU 113 performs determination on the basis of an external factor as to whether or not the provision of power is to be performed, unnecessary provision of power can be prevented. For example, in the case where the external factor is the expected time of next use of the electric vehicle, when there is not much time before the expected time of next use, the provision of power is not performed, but charging is performed by using power from the external power source, thereby enabling the two energy storage units to be reliably charged before the expected time of next use. Further, in the case where the external factor is the charging starting time at which charging by using power from the external power source starts, if the provision of power is performed when there is much time before the charging starting time, it is possible to suppress degradation of the high-capacity battery ES-E owing to charging by using power from the external power source. Accordingly, it is possible to reduce a loss in energy stored in the entire energy storage device owing to unnecessary provision of power.

In addition, when there is a short period before starting charging by using power from the external power source, since the lower limit of the SOC of the high-power battery ES-P, which decreases due to the provision of power, is set to a low value, the provision of power can be continued until the charging starting time at which charging by using power from the external power source starts, and a large amount of power can be supplied from the high-power battery ES-P to the high-capacity battery ES-E. Therefore, it is possible to reduce the charge amount of the high-capacity battery ES-E by using power from the external power source. Further, although the SOC of the high-power battery ES-P is decreased as a result of the provision of power to the high-capacity battery ES-E, the high-power battery ES-P can be charged immediately by using power from the external power source. Thus, the starting of charging by using power from the external power source increases the SOC.

Although the high-capacity battery ES-E has a lower resistance to degradation of storage capacity owing to charging than the high-power battery ES-P, since the ECU 113 controls the VCU 105 in such a manner that the charge rate of the high-capacity battery ES-E is lower than the charge rate of the high-power battery ES-P at the time of charging by using power supplied from the external power source, the degradation of the high-capacity battery ES-E owing to charging can be suppressed.

Furthermore, in the energy storage device 100 using both of the two batteries ES-E and ES-P having different characteristics, it is possible to charge both of the batteries while suppressing degradation of both of the batteries.

Furthermore, since the temperature of the high-capacity battery ES-E can be increased prior to the provision of power, the provision of power can be performed in the state where the high-capacity battery ES-E has excellent charge acceptance.

The present disclosure is not limited to the embodiment described above, and appropriate modifications and improvements may be made thereto. For example, although the electric vehicle described above is a 1-MOT electric vehicle (EV), the electric vehicle may be an EV including a plurality of motor generators, a hybrid electric vehicle (HEV) including an internal combustion engine along with at least one motor generator, a plug-in hybrid electric vehicle (PHEV), or a fuel cell vehicle (FCV).

In addition, it is possible to provide a VCU also on the high-capacity battery ES-E side and to perform provision of power by using the VCU on the high-capacity battery ES-E side. By providing two VCUs, the voltage to be applied to the motor generator 11 and the PDU 13 is not restricted by the high-capacity battery ES-E, thereby increasing efficiency.

According to a first aspect of the embodiment, there is provided an energy storage device including a first energy storage unit (e.g., a high-capacity battery ES-E), a second energy storage unit (e.g., a high-power battery ES-P) that has a higher resistance to degradation of a storage capacity owing to charging than the first energy storage unit, a voltage converter (e.g., a voltage control unit (VCU) 105) that converts an output voltage of the second energy storage unit or a voltage of power supplied from an external power source, and a controller (e.g., an electronic control unit (ECU) 113) that controls the voltage converter in such a manner that at least one of the first energy storage unit and the second energy storage unit is charged. The controller controls the voltage converter to perform provision of power from the second energy storage unit to the first energy storage unit prior to charging of at least one of the second energy storage unit and the first energy storage unit by using power supplied from the external power source.

According to a second aspect of the embodiment, a charge amount of the first energy storage unit per unit time at the time of the provision of power may be smaller than a charge amount of the first energy storage unit per unit time by using power supplied from the external power source.

According to a third aspect of the embodiment, on the basis of an external factor that affects charging and discharging of the first energy storage unit and the second energy storage unit, the controller may determine whether or not the provision of power is to be performed.

According to a fourth aspect of the embodiment, the energy storage device may be installed in a transport apparatus, and the external factor may be an expected time of next use of the transport apparatus.

According to a fifth aspect of the embodiment, the external factor may be a charging starting time at which charging of the energy storage device starts by using power supplied from the external power source.

According to a sixth aspect of the embodiment, on the basis of the charging starting time, the controller may determine a lower limit of energy that decreases due to the provision of power, the energy being stored in the second energy storage unit.

According to a seventh aspect of the embodiment, the controller may control the voltage converter in such a manner that a charge amount of the first energy storage unit per unit time is lower than a charge amount of the second energy storage unit per unit time at the time of charging of the first energy storage unit and the second energy storage unit by using power supplied from the external power source.

According to an eighth aspect of the embodiment, the second energy storage unit may have a lower power weight density and a higher energy weight density than the first energy storage unit.

According to a ninth aspect of the embodiment, the controller may increase a charge and discharge amount of the first energy storage unit when a temperature of the first energy storage unit is lower than a threshold prior to the provision of power.

According to a tenth aspect of the embodiment, there is provided a transport apparatus including the energy storage device according to any one of the first to ninth aspects of the present disclosure.

According to an eleventh aspect of the embodiment, there is provided a control method performed by an energy storage device including a first energy storage unit (e.g., a high-capacity battery ES-E), a second energy storage unit (e.g., a high-power battery ES-P) that has a higher resistance to degradation of a storage capacity owing to charging than the first energy storage unit, a voltage converter (e.g., a voltage control unit (VCU) 105) that converts an output voltage of the second energy storage unit or a voltage of power supplied from an external power source, and a controller (e.g., an electronic control unit (ECU) 113) that controls the voltage converter in such a manner that at least one of the first energy storage unit and the second energy storage unit is charged, the method including controlling, by using the controller, the voltage converter to perform provision of power from the second energy storage unit to the first energy storage unit prior to charging of at least one of the second energy storage unit and the first energy storage unit by using power supplied from the external power source.

According to the first, tenth, and eleventh aspects of the embodiment, prior to charging of at least one of the first energy storage unit and the second energy storage unit by using power supplied from the external power source, by the provision of power from the second energy storage unit to the first energy storage unit, the energy stored in the first energy storage unit is increased in advance. Thus, the charge amount of the first energy storage unit by using power from the external power source can be reduced. Since the first energy storage unit has a lower resistance to degradation of storage capacity owing to charging than the second energy storage unit, degradation of the first energy storage unit caused by charging can be suppressed by reducing the charge amount and number of charge operations of the first energy storage unit by using power from the external power source, as a result of the above-described provision of power.

According to the second aspect of the embodiment, while degradation of an energy storage unit is suppressed with a decrease in the charge amount per unit time, degradation of the first energy storage unit at the time of the provision of power can be further suppressed because the charge amount per unit time of the first energy storage unit at the time of the provision of power is lower than the charge amount per unit time of the first energy storage unit at the time of charging by using power from the external power source.

According to the third aspect of the embodiment, since whether or not the provision of power is to be performed is determined on the basis of an external factor, unnecessary provision of power can be prevented. Accordingly, it is possible to reduce a loss in energy stored in the entire energy storage device owing to unnecessary provision of power.

According to the fourth aspect of the embodiment, when there is not much time before the expected time of next use, the provision of power is not performed, but charging is performed by using power from the external power source, thereby enabling the two energy storage units to be reliably charged before the expected time of next use.

According to the fifth aspect of the embodiment, when there is much time before starting charging by using power from the external power source, if the provision of power is performed, it is possible to suppress degradation of the first energy storage unit owing to charging by using power from the external power source.

According to the sixth aspect of the embodiment, when there is a short period before starting charging by using power from the external power source, if the lower limit of the energy stored in the second energy storage unit, which decreases due to the provision of power, is set to a low value, the provision of power can be continued until the charging starting time, and a large amount of power can be supplied from the second energy storage unit to the first energy storage unit. Therefore, it is possible to reduce the charge amount of the first energy storage unit by using power from the external power source. Further, although the energy stored in the second energy storage unit is decreased as a result of the provision of power to the first energy storage unit, the second energy storage unit can be charged immediately by using power from the external power source. Thus, the starting of charging by using power from the external power source increases the energy stored.

According to the seventh aspect of the embodiment, since the first energy storage unit has a lower resistance to degradation of storage capacity owing to charging than the second energy storage unit, if the charge amount per unit time of the first energy storage unit is lower than the charge amount per unit time of the second energy storage unit at the time of charging by using power supplied from the external power source, the degradation of the first energy storage unit owing to charging can be suppressed.

According to the eighth aspect of the embodiment, in the energy storage device using both of the two energy storage units having different characteristics, it is possible to charge both of the energy storage units while suppressing degradation of both of the energy storage units.

According to the ninth aspect of the embodiment, since the temperature of the first energy storage unit can be increased prior to the provision of power, the provision of power can be performed in the state where the first energy storage unit has excellent charge acceptance.

Obviously, numerous modifications and variations of the present invention are possible in light of the above teachings. It is therefore to be understood that within the scope of the appended claims, the invention may be practiced otherwise than as specifically described herein.

What is claimed is:

1. An energy storage device comprising:
   a first energy storage having a first resistance to degradation of a charging capacity of the first energy storage;
   a second energy storage having a second resistance to degradation of a charging capacity of the second energy storage higher than the first resistance;
   a voltage converter to convert a voltage output from the second energy storage or supplied from an external electric power source to charge at least one of the first energy storage and the second energy storage; and
   a controller configured to control the voltage converter to supply electric power from the second energy storage to the first energy storage before charging the at least one of the second energy storage and the first energy storage with electric power supplied from the external electric power source wherein a charge amount of the first energy storage per unit time at a time of a provision of electric power from the second energy storage to the first energy storage is smaller than a charge amount of the first energy storage per unit time with electric power supplied from the external electric power source.

2. The energy storage device according to claim 1, wherein, based on an external factor that affects charging and discharging of the first energy storage and the second energy storage, the controller determines whether or not a provision of electric power is to be performed.

3. The energy storage device according to claim 2, wherein
   the energy storage device is installed in a transport apparatus, and
   the external factor is an expected time of next use of the transport apparatus.

4. The energy storage device according to claim 2, wherein the external factor is a charging starting time at which charging of the energy storage device starts with electric power supplied from the external electric power source.

5. The energy storage device according to claim 4, wherein, based on the charging starting time, the controller determines a lower limit of energy that decreases due to the provision of electric power, the energy being stored in the second energy storage.

6. The energy storage device according to claim 1, wherein the controller controls the voltage converter in such a manner that the charge amount of the first energy storage per unit time is lower than the charge amount of the second energy storage per unit time at the time of charging of the first energy storage and the second energy storage with electric power supplied from the external electric power source.

7. The energy storage device according to claim 1, wherein the second energy storage has a higher power weight density and a lower energy weight density than the first energy storage.

8. The energy storage device according to claim 1, wherein the controller increases a charge and discharge amount of the first energy storage when a temperature of the first energy storage is lower than a threshold prior to a provision of electric power.

9. A transport apparatus comprising:
the energy storage device according to claim 1.

10. The energy storage device according to claim 1, wherein the first energy storage has a first storage capacity that is higher than a second storage capacity of the second energy storage.

11. The energy storage device according to claim 1, wherein the controller is configured to control the voltage converter to supply the electric power from the second energy storage to the first energy storage before charging either of the second energy storage and the first energy storage with the electric power supplied from the external electric power source.

12. A control method comprising:
charging at least one of a first energy storage and a second energy storage, a first energy storage having a first resistance to degradation of a charging capacity of the first energy storage, a second energy storage having a second resistance to degradation of a charging capacity of the second energy storage higher than the first resistance;
converting a voltage output from the second energy storage or supplied from an external electric power source; and
supplying electric power from the second energy storage to the first energy storage before charging the at least one of the second energy storage and the first energy storage with electric power supplied from the external electric power source wherein a charge amount of the first energy storage per unit time at a time of a provision of electric power from the second energy storage to the first energy storage is smaller than a charge amount of the first energy storage per unit time with electric power supplied from the external electric power source.

13. The control method according to claim 12, wherein the first energy storage has a first storage capacity that is higher than a second storage capacity of the second energy storage.

14. The control method according to claim 12, wherein the supplying the electric power includes supplying the electric power from the second energy storage to the first energy storage before charging the at least one of the second energy storage and the first energy storage with the electric power supplied from the external electric power source while the external electric power source is connected.

15. The control method according to claim 12, wherein the supplying the electric power includes supplying the electric power from the second energy storage to the first energy storage before charging either of the second energy storage and the first energy storage with the electric power supplied from the external electric power source.

16. An energy storage device comprising:
a first energy storage having a first resistance to degradation of a charging capacity of the first energy storage;
a second energy storage having a second resistance to degradation of a charging capacity of the second energy storage higher than the first resistance;
a voltage converter to convert a voltage output from the second energy storage or supplied from an external electric power source to charge at least one of the first energy storage and the second energy storage; and
a controller configured to control the voltage converter to supply electric power from the second energy storage to the first energy storage before charging the at least one of the second energy storage and the first energy storage with electric power supplied from the external electric power source while the external electric power source is connected to the energy storage device wherein a charge amount of the first energy storage per unit time at a time of a provision of electric power from the second energy storage to the first energy storage is smaller than a charge amount of the first energy storage per unit time with electric power supplied from the external electric power source.

* * * * *